United States Patent Office 2,714,748
Patented Aug. 9, 1955

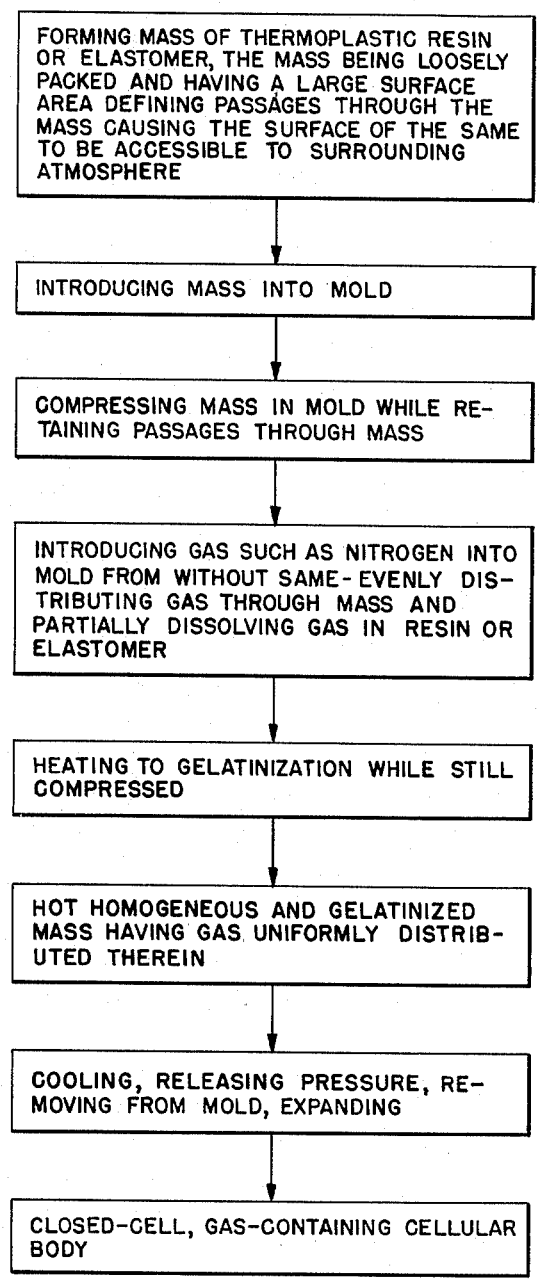

---

2,714,748

PROCESS OF PRODUCING CLOSED-CELL CELLULAR BODIES

Ernst Stirnemann, Basel, and Herbert Lindemann, Sins, Switzerland

Application December 9, 1952, Serial No. 325,021

Claims priority, application Switzerland December 12, 1951

10 Claims. (Cl. 18—48)

The present invention relates to a process of producing closed-cell, gas-containing cellular bodies and more particularly of producing bodies of this type from elastomers such as natural and artificial rubber and from thermoplastic resins and the like.

Various methods have been suggested for the manufacture of closed-cell cellular bodies. The methods of manufacture are generally classifiable in one of two groups.

The first group includes methods whereby the gases are introduced into the starting material by mixing the starting material with a blowing agent which liberates gas upon being heated. These methtods have the disadvantage that the blowing agents are quite expensive and in addition are often toxic leaving behind undesirable impurities in the mass. Moreover high temperatures are generally required in order to decompose the blowing agent.

The second group comprises methods wherein the gases are introduced from outside into a compact mass. The methods of this group also have shortcomings; namely it is necessary to compress the gases by means of compressors to an extremely high pressure of at least 100 atmospheres and generally up to about 500 atmospheres. Moreover, the introduction of the gases into the already heated, gelatinized mass prevents homogeneous distribution of the gases so that the final body is not completely homogeneous. Furthermore the starting materials are generally introduced into the mold or autoclave in the form of paste in which state they have only a limited gas-absorbing property. Consequently, the depth to which the gases penetrate and the velocity with which they dissolve in the mass is small. Even rubber, which has better power of absorption for gases than synthetic resins, requires in actual practice about 2 hours for the incorporation of the gas if the material is used in thin sheets, and up to 24 hours if used in thicker sheets.

In our copending application Serial No. 173,485, filed July 12, 1950, for "Manufacture of Cellular Bodies," of which the present application is a continuation-in-part, a process was disclosed for overcoming the above enumerated difficulties wherein by said process it is unnecessary to utilize blowing agents in order to obtain homogeneous cellular bodies and whereby all disadvantages of introducing gas from without the mass into the mass are avoided.

The present invention also deals with and has as the main object hereof a process for producing closed-cell, gas-containing cellular bodies within the second group of methods by introduction of the gas from without the mass into the mass whereby all of the disadvantages of this type of method are obviated and whereby cellular bodies having a very uniform cell structure and the desired specific gravity are produced in a short time.

It is a further object of the present invention to provide a process of producing closed-cell, gas-containing cellular bodies of very uniform cell structure without the necessity for utilizing blowing agents in order to obtain such uniform cell structure.

It is a still further object of the present invention to provide processes of forming masses of thermoplastic resins and elastomers having a large surface area in proportion to the volume and having air gas passages throughout the masses.

With the above objects in view the present invention mainly comprises a process of preparing closed-cell, gas-containing cellular bodies of natural and artificial elastomers and thermoplastic resins, comprising the steps of substantially filling a mold with a mass of at least one substance selected from the group consisting of elastomers and thermoplastic resins, said mass being loosely packed and having a large surface area defining passages through said mass causing the surface of the same to be accessible to the surrounding atmosphere; compressing said mass so as to substantially decrease the volume thereof while retaining said passages through said mass; introducing gas under pressure from without said mold into said mold, thereby increasing the gas pressure in said mold and incorporating the gas in said mass; heating the contents of said mold while still compressed until gelatinization of said mass, thereby forming a homogeneous mass of said substance having said gas incorporated therein; and cooling the thus formed homogeneous, gas-including mass, releasing the pressure thereon and causing the same to expand, thereby forming a closed-cell, gas-containing cellular body.

It was found that the production of bodies having closed cells by the application of gas from without the mass into the mass is advantageously accomplished by the utilization of a loosely packed mass having a large surface area in proportion to the volume of the mass and also having air passages throughout the mass, the mass consisting either solely of the elastomer and/or the thermoplastic resin or containing solvent and/or plasticizer. Upon mechanically compressing this mass the volume thereof is greatly reduced but there still remain air passages throughout the mass so that upon the introduction of compressed gas under pressure the compressed gas is distributed throughout the passages about the entire surface in the mass and incorporated homogeneously into said mass. This incorporation or dissolution of the gas in the mass takes only a relatively short period of time according to this process. The compressed mass containing the gas under presssure is then heated so as to gelatinize the mass. Upon cooling the heated mass, releasing the pressure thereon and allowing the same to expand in any customary manner a cellular body is formed having a very regular structure and containing fine cells.

It is essential according to the process of the present invention that the elastomer such as natural and artificial rubber or the thermoplastic resins, with or without solvent and/or plasticizer, should have a large surface area and air passages throughout the mass thereof and furthermore that the large surface area and air passages remain upon compressing the mass at room temperature before heating the same to gelatinization. It is therefore necessary that the mass, depending on the type and content of solvent and/or plasticizer, does not run together, upon compression at room temperature, to form a pasty or compact mass. This is so in order that the air passages remain in the mass.

By the utilization of a mass which under pressure at room temperature retains its large surface area and air passages, the gas which is introduced under pressure into the mold containing the mass distributes itself throughout the air passages and is very quickly and homogeneously incorporated in the mass so that the resulting cellular body after expansion is homogeneous as to shape and gas content.

In order to have a mass which has a large surface area in proportion to the volume thereof and which has air passages therein it is most suitable to have the particles of the mass finely divided, i. e. in powder form. The powdered thermoplastic resin may be mixed with a solvent or plasticizer or both so as to increase the gas-absorbing properties of the resin, however the amount of solvent and/or plasticizer should not be so great that upon application of mechanical pressure to the mass at room temperature the particles of the mass run together and the air passages therein are destroyed. This property of retaining the air passages in the mass even upon compression of the same is dependent upon the raw material, the type and amount of solvent and/or plasticizer and also the manner in which the same is mixed with the resin mass.

For example, utilizing 100 parts by weight of powdered polyvinyl chloride and mixing the same with 80 parts by weight dioctylphthalate, a loose powder is formed. However under mechanical pressure even at room temperature the mass runs together and therefore this mass is unsuitable for the process of the present invention because the air passages do not remain at the time the gas is introduced from without. Utilizing 100 parts by weight of the same type of polyvinyl chloride powder and mixing with 80 parts by weight of tetrahydrofurane the mass becomes swollen and somewhat powdery. By the addition of 80 parts by weight dioctylphthalate to the thus treated material a finely divided swollen powder is formed which does not run together upon being compressed at normal temperatures. The compression of this mass at normal temperatures does not cause loss of the air passages therein so that the introduced gas is easily distributed throughout the air passages and is homogeneously distributed throughout the mass.

Another means of controlling the powdery plasticizer-containing material so that the same does not run together upon being compressed at normal temperatures, without the necessity of utilizing a solvent as above described, comprises either allowing the polyvinyl chloride mass having the plasticizer added thereto to stand at normal temperatures for a time period of i. e. 8–14 days, or to stand for a shorter period of time at somewhat higher temperatures.

It has furthermore been determined that the property of retaining the large surface area and air passages upon compression at normal temperatures with the addition of plasticizer and/or solvent to increase the gas-absorbing properties of the resin is also dependent on the manner in which the resin powder is treated with the solvent and/or plasticizer. The resin powder is preferably treated by spraying the solvent thereon in a mixing apparatus while vigorously stirring. In this manner the powdered material is homogeneously treated with the solvent and the desired final condition wherein the resin is in swollen, almost gelatinized state is easily attained. The swollen powder can then take up a greater amount of plasticizer than would be possible if the powdery starting material had been treated by pouring the solvent thereon so that the powdery consistency had not been lost by swelling. In order for the final product to take up a larger amount of plasticizer it is necessary to utilize fairly considerable amounts of solvent which is undesirable in the final product and which should be eventually removed therefrom.

If only a small amount, or no solvent is utilized, then it is possible to mix the thermoplastic resin with only a small amount of plasticizer and still retain the desired physical property. For the formation of a mixture of 60 parts by weight polyvinyl chloride and 40 parts plasticizer it is possible to at first add only 20 parts by weight plasticizer with the 60 parts polyvinyl chloride so as to form a loose powdery mixture having the desired physical properties of large surface area and air passages. By allowing this mixture to stand for a time period, which may be shortened by the use of higher temperatures, it is then possible to add additional plasticizer without losing the powdery consistency of the mass upon compression of the same at normal temperature. In this manner it is possible to form polyvinyl chloride masses with high quantities of plasticizer without the use of solvent while still retaining the necessary properties of the mass.

It is not necessary to incorporate the plasticizer in the powdery polyvinyl chloride. However, it is also possible to carry out the process in a manner so that the polyvinyl chloride and plasticizer is gelatinized on a suitable machine so as to form a substantially solid body of the polyvinyl chloride and plasticizer. The thus formed body can then be finely divided, if desired into powdery form. This manner of proceeding is suitable for the process of the present invention in order to obtain a starting material which has the desired characteristics.

Although the process of the present invention may be carried out utilizing simply the elastomer itself in finely divided form or the thermoplastic resin itself in such form, in the case of thermoplastic resins such as polyvinyl chloride the gas-absorbing ability of the polyvinyl chloride is very low and in fact is too low for the production of light cellular bodies having a great number of cells and a high gas content. In order to increase the gas-absorbing ability of such thermoplastic resins it is desirable to utilize certain agents such as solvents and/or plasticizers which give this ability to the resins. Not all plasticizers are equally suitable for increasing the gas-absorbing ability of the resin. High boiling point plasticizers such as dioctylphthalate give to the resin a slightly inferior gas-absorbing property. Somewhat better results in this respect are obtained with dibutylphthalate and still better results are obtained with dimethylphthalate. Low boiling point plasticizers however, despite their greater volatility and ability to be washed out, often give the final cellular body undesirable properties. It is therefore more suitable to utilize high boiling plasticizers. When, however, it is desired to produce very light cellular bodies which have a high gas content, it is necessary to either increase the gas pressure or to add solvent along with the high boiling point plasticizer in order to sufficiently improve the gas-absorbing ability of the polyvinyl chloride masses. In general it is sufficient to add a small amount of the solvent i. e.; about 10–20%. The solvent can, after the production of the cellular bodies, easily be removed therefrom by vaporization.

As thermoplastic resin it is possible to utilize according to the process of the present invention all of the usual type of polymers used in making of cellular bodies such as for example polyvinyl chloride, mixed polymers of polyvinyl chloride and mixtures of polyvinyl chloride with other polymers. Suitable mixed polymers include though are not limited to vinyl chloride with styrol, with acrylic resins, with cellulose esters etc.

It is also possible to utilize as starting material elastomers such as natural and synthetic rubbers. It is however noted that the starting material must be in loose state, have a large surface area and air passages therein and should have, particularly in the case of thermoplastic resins, an addition of solvent and/or softening agents which increase the gas-dissolving ability of the starting material.

As plasticizer it is suitable to utilize phthalates such as dioctylphthalate, dibutylphthalate, dimethylphthalate, etc., tricresyl phosphate, sebacic acid esters, esters of polyfunctional alcohols with fatty acids, etc.

As solvent it is suitable to utilize ketones such as acetone, methylethyl ketone, other ketones, esters such as ethyl acetate, butyl acetate, etc.

It is to be understood, however, that the scope of the present invention is not meant to be limited to any of the substances specified, the above substances being given for illustrative purposes only.

The process of the present invention may also be carried out utilizing other than powdery masses which have a large surface area. It is also possible to utilize as starting material having a large surface area pre-formed bodies of the same type having for example the form of foils, sponge bodies or porous bodies, which can be formed by loosely sintering together thermoplastic resins containing solvents and/or plasticizers. When using foils it is suitable to fill the mold with the foils by arranging powdered resin between the layers of foils so that the same always have the air passages throughout. Preformed bodies of this type can be treated according to the process of the present invention by compressing the same under mechanical pressure, introducing gas under pressure into the mold containing the compressed mass to cause incorporation of the gas in said mass, heating so as to gelatinize the mass and cooling, releasing the pressure and allowing the gas-containing mass to expand in any customary manner to obtain a gas-containing homogeneous mass.

Any suitable apparatus may be utilized with the process of the present invention, particularly apparatus to which it is possible to apply mechanical pressure such as hydraulic pressure in order to compress the contents of the mold.

The applied pressure can be varied greatly depending on the type of starting material and may, for example, vary between 5–200 kg./cm.$^2$. For the most part it is desirable to utilize pressures under 1000 kg./cm.$^2$ and preferably with polyvinyl chloride-containing masses a mechanical pressure of 250–500 kg./cm.$^2$ is most desirable.

After sufficiently compressing the mass, a gas under pressure is forced into the mold. Of course the gas introduced under pressure must be at a greater pressure than the pressure of the gas, which has been compressed with the mass in the mold and is preferably 30–2000 Kg.cm.$^2$, however the gas pressure can be below the mechanical pressure applied to the mold or it can be equal to the mechanical pressure. Since the gas pressure is independent of the mechanical pressure it is thereby possible to form lighter or heavier cellular bodies by controlling the pressure of the gas supplied.

Any suitable gas which does not react chemically with the compressed mass may be utilized. The most suitable from the point of view of economy is of course nitrogen, though for particular purposes it is possible to utilize hydrogen, carbon dioxide or mixtures of gases. Hydrogen has the advantage of being easily diffusible and carbon dioxide has the advantage of being highly soluble in most plasticizers so that utilizing this gas it is possible to have as starting material resins and plasticizers without the necessity for utilizing solvents.

It is advantageous according to a preferred embodiment of the present invention to mix a small amount of blowing agents with the starting material, i. e. about 1–2%. These blowing agents in combination with the process of the present invention for very light cellular bodies. Any suitable blowing agent may be utilized for this purpose, the common blowing agents being azo compounds such as azoisobutyric dinitrils, azoaminobenzol, and the like.

The proportions of the reactants may vary within extremely wide limits for the process of the present invention. With polyvinyl chloride as the resin the best results have been obtained utilizing 40–65 parts by weight of solvents per each 100 parts by weight of polyvinyl chloride, utilizing a mechanical compressing pressure of 300–500 kg./cm.$^2$, gas at a pressure of 275–450 kg./cm.$^2$ and a gelatinization temperature of 160–170° C.

Utilizing a plasticizer excellent results have been obtained wherein the amount of plasticizer is 50–75 parts by weight per each 100 parts by weight polyvinyl chloride and with a mechanical pressure of 200–400 kg./cm.$^2$, a gas pressure of 250–500 kg./cm.$^2$ and a gelatinization temperature of 160–170° C.

Utilizing with polyvinyl chloride as resin, both solvent and plasticizer the best results have been obtained with 40–60 parts by weight solvent and 80–100 parts by weight plasticizer per each 100 parts by weight polyvinyl chloride and using a mechanical pressure of 250–500 kg./cm.$^2$, a nitrogen gas pressure of 200–400 kg./cm.$^2$ and a temperature of 160–170° C.

The following examples are given as illustrative of preferred processes according to the present invention. It is to be understood that these examples are for illustrative purposes only and are in no way meant to limit the scope of the present invention.

*Example 1*

A mold having a 10 liter content is filled with a powdery mixture of 70 parts by weight polyvinyl chloride and 30 parts by weight methylethyl ketone. The weight of the mixture introduced into the mold is 4.5 kg. This mass has a true volume (when all the air is removed therefrom) of 4 liters so that it is apparent that in the powdery mass (between the particles of the mixture) is contained about 6 liters of gas.

The contents of the mold are then compressed under a pressure of about 250 kg./cm.$^2$ by pressing a plunger into the mold whereby the volume of the mass is reduced to about 4.5 liters. Since the mold is closed none of the gas contained between the particles of the mass can escape. It may therefore be seen that approximately 6 liters of gas is compressed to about one half liter which is equivalent to a maximum pressure of about 10 atmospheres; the excess pressure from the 250 kg./cm.$^2$ is taken up by the material itself. Nitrogen gas is then introduced into the mold from without the mold at a pressure of about 300–400 atmospheres, causing the incorporation of the gas in said mass. The mass while still compressed is then heated to a temperature of about 140° C. and gelatinized. The mass is then cooled, the pressure released and the mass removed from the mold and caused to expand by warming the same.

*Example 2*

1500 g. well stabilized polyvinyl chloride is mixed with about 900 g. of a volatile solvent such as methylethyl ketone in such manner that a loose powdery mixture is obtained. To this mixture is added while constantly stirring 1500 g. of a plasticizer such as dioctylphthalate. The loose powdery mixture absorbs the plasticizer without causing the individual granules of the mixture to come together to form a pasty mash. The amount of volatile solvent in the mixture is adjusted by evaporation to be about 20% by weight calculated against the weight of polyvinyl chloride plus plasticizer.

3500 g. of this powdery mixture is pressed by means of a hydraulic press exerting a mechanical pressure of about 375 kg./cm.$^2$ into a mold, the filled space in the mold having a volume of about 3000 kg./cm.$^2$ and a height of about 50 mm.

The mold consists of a strong walled vessel having a plunger which is tight against the vessel walls and either alone or with the help of mechanical pressure is held against the surface of the mold to make the mold gastight. A gas mixture of hydrogen and nitrogen is then introduced from without the mold into the same at a pressure of about 375 atm. and the mass is heated in the usual manner at about 170° C. for 100–120 minutes. The occurrence of a rise in pressure by warming the mass can be compensated by means of a suitable opening which allows a portion to escape from the mass. The mold and the contents thereof are then cooled and the mold is opened. The body taken from the mold is then by re-warming caused to expand forming the desired cellular body having closed cells.

Simultaneously with the warming of the body to cause the same to expand the volatile solvent is either partially or completely removed therefrom by evaporation. The remaining solvent can be removed by allowing the cellular body to stand for a period of time at room temperature. The resulting soft elastic cellular body has a specific gravity of about 0.1.

*Example 3*

1500 gr. of a powdery mixture consisting 100% by weight of well stabilized polyvinyl chloride or a mixed polymer of 95 parts polyvinyl chloride and 5 parts polyvinyl acetate, and 45 parts of a volatile solvent which is applied to the resin by spraying the same on the powdered resin in a mixer while vigorously stirring, is formed.

This powdery mixture is compressed by means of a hydraulic press at a pressure of 480 kg./cm.$^2$ into a form the volume of the mass in the form being about 1440 cm.$^3$ and the height therein about 38.5 mm. As explained in Example 1 the mold is closed and made gas-tight.

The mold is then filled in a suitable manner with nitrogen gas introduced into the mold from without the same at a pressure of about 430 atm., the amount of nitrogen being about 25 liters per kg. of the final mixture. The mass is then heated in a suitable manner for about 100 minutes at a temperature of about 170° C. The mold is then cooled and opened.

The cellular body taken from the mold is then re-warmed in order to expand the same and the solvent is removed by evaporation. The resulting cellular body is hard and has a specific gravity of about 0.035.

*Example 4*

1200 g. of well stabilized polyvinyl chloride or the same amount of a mixed polymer consisting of 95 parts polyvinyl chloride and 5 parts polyvinyl acetate is mixed while constantly stirring with 400 g. of a plasticizer such as dioctylphthalate to form a loose powdery mixture. The resin-plasticizer mixture is stored for about 48–72 hours at a slightly raised temperature of about 30–40° C. to form a better texture, i. e. to cause the composition to swell to an almost gelled state. The resulting mixture is then mixed while constantly stirring with 400 g. of an additional plasticizer such as dibutyl phthalate and the mixture is again stored.

The material resulting by this process has the necessary powdery consistency and is then by means of a mechanical pressure of about 300 kg. cm.$^2$ pressed into a mold, the filled volume of the mass in the mold being about 1800 cm.$^3$ and the height about 30 mm. The mold is then sealed and made air-tight and filled at a charging temperature of about 35–40° C. with carbon dioxide gas at a pressure of 210 atm. The mass is then heated at a temperature of about 170° C. for about 100–120 minutes. The mold is then cooled and opened. The cellular body removed from the mold is then re-warmed in suitable manner to cause the same to expand and the resulting closed-cell cellular body has a specific gravity of about 0.15.

*Example 5*

55 parts by weight of well stabilized polyvinyl chloride is mixed with 45 parts of a plasticizer consisting of a mixture of ⅔ dioctylphthalate and ⅓ dibutylphthalate and the resulting mixture is gelatinized in a suitable apparatus. The gelatinized body is then subdivided by means of a mill into a powdery state. In order to increase the gas-absorbing ability of the powdery gelatinized body, the same is mixed with about 25% of a solvent such as acetone which amount does not cause a loss of powdery characteristics.

1600 g. of this powdered mixture is then pressed into a mold by mechanical pressure of about 500 kg./cm.$^2$, the space occupied by the mass in the mold being about 1540 cm.$^3$ and the height about 41 mm. The mold which is closed and made air-tight in a suitable manner is filled with nitrogen gas under a pressure of 450 atm. and the mass is heated for about 60 minutes at a temperature of about 140° C. until the powdery mass is gelatinized to form a homogeneous gas including mass. The mass is then further treated as in Examples 2 and 3 and the resulting cellular body has a specific gravity of about 0.05.

*Example 6*

A mixture of 500 g. polyvinyl chloride and 500 g. dioctylphthalate is plasticized homogeneously at a temperature of about 170° C. and on a rolling mill is drawn into the form of a foil having a thickness of about 0.4 mm. The foil is cut into pieces corresponding to the size of a mold i. e. about 20 pieces and is then mixed with volatile solvent such as acetone until the foils take up about 20% by weight of the acetone. The pieces are then laid one upon the other placing dry, powdered polyvinyl chloride between each layer.

The thus formed pack of foils is then placed in a suitable mold. A mechanical pressure of about 250–300 kg./cm.$^2$ is then applied to the material. The mold is then made air-tight and nitrogen gas at a pressure of about 500 atm. is introduced into the mold until the same is filled at said pressure. The mass is then heated to a temperature of about 140° C. The foils flow together due to the pressure and heat, gelatinizing to form a single body.

The mass is then cooled, the pressure on the mold released and the mass removed from the mold and treated as described in the previous examples. The resulting cellular body has a thickness of about 18–20 mm. and a specific gravity of about 0.06.

*Example 7*

A spongy body of about 70 parts by weight polyvinyl chloride and 30 parts by weight tricresyl phosphate is treated with acetone until the body takes up about 25% by weight of the acetone. The spongy body has been preformed to have the approximate form of the mold. The body is then placed in the mold, compressed by mechanical pressure of about 250 kg./cm.$^2$, and then treated with about 200 kg. nitrogen gas forced into the mold from without the same under pressure. The mold containing the mass is then heated to a temperature of about 140° and gelatinized to form a homogeneous body. The mass is then further treated as in Example 6.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process of preparing closed-cell, gas-containing cellular bodies of natural and artificial elastomers and thermoplastic resins, comprising the steps of introducing into an open mold a mass composed of particles of solid material selected from the group consisting of elastomers and thermoplastic resins, said mass being loosely packed and having a large surface area defining passages through said mass causing the surface of the same to be accessible to surrounding atmosphere; closing said mold; mechanically compressing said mass so as to substantially decrease the volume thereof while retaining passages through said mass; introducing a gas which is substantially insoluble in said mass at atmospheric pressure from without said mold into said mold, thereby increasing the gas pressure in said mold and distributing said gas through said mass and the elevated pressure causing partial dissolution of said gas in said solid material of said mass; heating the contents of said mold while still compressed until gelatinization of said material, thereby forming a homogeneous mass of said material having said gas evenly distributed therein; and cooling the thus formed mass and releasing the pressure thereon, thereby causing the same to expand and form a closed-cell gas-containing cellular body.

2. A process of preparing closed-cell, gas-containing cellular bodies of natural and artificial elastomers and thermoplastic resins, comprising the steps of introducing into an open mold a mass composed of powdered particles of solid material selected from the group consisting of elastomers and thermoplastic resins, said mass being loosely packed and having a large surface area defining passages through said mass causing the surface of the same to be accessible to surrounding atmosphere; closing said mold; mechanically compressing said mass so as to substantially decrease the volume thereof while retaining passages through said mass; introducing a gas which is substantially insoluble in said mass at atmospheric pressure from without said mold into said mold, thereby increasing the gas pressure in said mold and distributing said gas through said mass and the elevated pressure causing partial dissolution of said gas in said solid material of said mass; heating the contents of said mold while still compressed until gelatinization of said material, thereby forming a homogeneous mass of said material having said gas evenly distributed therein; and cooling the thus formed mass and releasing the pressure thereon, thereby causing the same to expand and form a closed-cell gas-containing cellular body.

3. A process of preparing closed-cell, gas-containing cellular bodies of natural and artificial elastomers and thermoplastic resins, comprising the steps of introducing into an open mold a mass composed of foils of solid material selected from the group consisting of elastomers and thermoplastic resins, said mass being loosely packed and having a large surface area defining passages through said mass causing the surface of the same to be accessible to surrounding atmosphere; mechanically compressing said mass so as to substantially decrease the volume thereof while retaining passages through said mass; introducing a gas which is substantially insoluble in said mass at atmospheric pressure from without said mold into said mold, thereby increasing the gas pressure in said mold and distributing said gas through said mass and the elevated pressure causing partial dissolution of said gas in said solid material of said mass; heating the contents of said mold while still compressed until gelatinization of said material, thereby forming a homogeneous mass of said material having said gas evenly distributed therein; and cooling the thus formed mass and releasing the pressure thereon, thereby causing the same to expand and form a closed-cell gas-containing cellular body.

4. A process of preparing closed-cell, gas-containing cellular bodies of natural and artificial elastomers and thermoplastic resins, comprising the steps of introducing into an open mold a mass composed of particles of solid material selected from the group consisting of elastomers and thermoplastic resins, said mass being loosely packed and having a large surface area defining passages through said mass causing the surface of the same to be accessible to surrounding atmosphere; mechanically compressing said mass at atmospheric pressure with a mechanical pressure of 5–2000 kg/cm² so as to substantially decrease the volume thereof while retaining passages through said mass; introducing a gas which is substantially insoluble in said mass at atmospheric pressure from without said mold into said mold at a pressure of 30–2000 kg./cm.², thereby increasing the gas pressure in said mold and distributing said gas through said mass and the elevated pressure causing partial dissolution of said gas in said solid material of said mass; heating the contents of said mold while still compressed until gelatinization of said material, thereby forming a homogeneous mass of said material having said gas evenly distributed therein; and cooling the thus formed mass and releasing the pressure thereon, thereby causing the same to expand and form a closed-cell gas-containing cellular body.

5. A process of preparing closed-cell, gas-containing cellular bodies of natural and artificial elastomers and thermoplastic resins, comprising the steps of introducing into an open mold a mass composed of particles of solid material selected from the group consisting of elastomers and thermoplastic resins, said mass being loosely packed and having a large surface area defining passages through said mass causing the surface of the same to be accessible to surrounding atmosphere; closing said mold; mechanically compressing said mass with a mechanical pressure of 200–500 kg./cm.² so as to substantially decrease the volume thereof while retaining passages through said mass; introducing a gas which is substantially insoluble in said mass at atmospheric pressure from without said mold into said mold at a pressure of 200–500 kg./cm.², thereby increasing the gas pressure in said mold and distributing said gas through said mass and the elevated pressure causing partial dissolution of said gas in said solid material of said mass; heating the contents of said mold while still compressed until gelatinization of said material, thereby forming a homogeneous mass of said material having said gas evenly distributed therein; and cooling the thus formed mass and releasing the pressure thereon, thereby causing the same to expand and form a closed-cell gas-containing cellular body.

6. A process of preparing closed-cell, gas-containing cellular bodies of natural and artificial elastomers and thermoplastic resins, comprising the steps of introducing into an open mold a mass composed of particles of solid material selected from the group consisting of elastomers and thermoplastic resins and having a blowing agent admixed therewith, said mass being loosely packed and having a large surface area defining passages through said mass causing the surface of the same to be accessible to surrounding atmosphere; closing said mold; mechanically compressing said mass so as to substantially decrease the volume thereof while retaining passages through said mass; introducing a gas which is substantially insoluble in said mass at atmospheric pressure from without said mold into said mold, thereby increasing the gas pressure in said mold and distributing said gas through said mass and the elevated pressure causing partial dissolution of said gas in said solid material of said mass; heating the contents o fsaid mold while still compressed until gelatinization of said material, thereby forming a homogeneous mass of said material having said gas including the gas evolved from said blowing agent upon heating the same evenly distributed therein; and cooling the thus formed mass and releasing the pressure thereon, thereby causing the same to expand and form a closed-cell gas-containing cellular body.

7. A process of preparing closed-cell, gas-containing cellular bodies of natural and artificial elastomers and thermoplastic resins, comprising the steps of introducing into an open mold a mass composed essentially of particles of solid thermoplastic resin consisting at least partly of polyvinyl chloride, said mass being loosely packed and having a large surface area defining passages through said mass causing the surface of the same to be accessible to surrounding atmosphere; closing said mold; mechanically compressing said mass so as to substantially decrease the volume thereof while retaining passages through said mass; introducing a gas which is substantially insoluble in said mass at atmospheric pressure from without said mold into said mold, thereby increasing the gas pressure in said mold and distributing said gas through said mass and the elevated pressure causing partial dissolution of said gas in said solid material of said mass; heating the contents of said mold while still compressed until gelatinization of said material, thereby forming a homogeneous mass of said material having said gas evenly distributed therein; and cooling the thus formed mass and releasing the pressure thereon, thereby causing the same to expand and form a closed-cell gas-containing cellular body.

8. A process of preparing closed-cell, gas-containing cellular bodies of natural and artificial elastomers and thermoplastic resins, comprising the steps of forming a gelatinized body of at least one thermoplastic resin; subdividing the thus formed thermoplastic resin body into relatively small solid particles of the same so as to greatly increase the surface area thereof; introducing a mass of said solid particles of thermoplastic resin into an open mold, said mass being loosely packed and having a large surface area defining passages through said mass causing the surface of the same to be accessible to surrounding atmosphere; closing said mold; mechanically compressing said mass so as to substantially decrease the volume thereof while retaining passages through said mass; introducing a gas which is substantially insoluble in said mass at atmospheric pressure from without said mold into said mold, thereby increasing the gas pressure in said mold and distributing said gas through said mass and the elevated pressure causing partial dissolution of said gas in said solid material of said mass; heating the contents of said mold while still compressed until gelatinization of said material, thereby forming a homogeneous mass of said material having said gas evenly distributed therein; and cooling the thus formed mass and releasing the pressure thereon, thereby causing the same to expand and form a closed-cell gas-containing cellular body.

9. A process of preparing closed-cell, gas-containing cellular bodies of natural and artificial elastomers and thermoplastic resins, comprising the steps of forming a gelatinized body of at least one thermoplastic resin; subdividing the thus formed thermoplastic resin body into relatively small solid foils of the same so as to greatly increase the surface area thereof; introducing a mass of said solid foils of thermoplastic resin having powdered particles of said thermoplastic resin arranged between said foils into an open mold, said mass being loosely packed and having a large surface area defining passages through said mass causing the surface of the same to be accessible to surrounding atmosphere; closing said mold; mechanically compressing said mass so as to substantially decrease the volume thereof while retaining passages through said mass; introducing a gas which is substantially insoluble in said mass at atmospheric pressure from without said mold into said mold, thereby increasing the gas pressure in said mold and distributing said gas through said mass and the elevated pressure causing partial dissolution of said gas in said solid material of said mass; heating the contents of said mold while still compressed until gelatinization of said material, thereby forming a homogeneous mass of said material having said gas evenly distributed therein; and cooling the thus formed mass and releasing the pressure thereon, thereby causing the same to expand and form a closed-cell gas-containing cellular body.

10. A process of preparing closed-cell, gas-containing cellular bodies of natural and artificial elastomers and thermoplastic resins, comprising the steps of introducing into an open mold a mass composed of particles of solid material selected from the group consisting of elastomers and thermoplastic resins, said mass being loosely packed and having a large surface area defining passages through said mass causing the surface of the same to be accessible to surrounding atmosphere; closing said mold; mechanically compressing said mass so as to substantially decrease the volume thereof while retaining passages through said mass; introducing a gas selected from the group consisting of nitrogen, hydrogen and carbon dioxide from without said mold into said mold, thereby increasing the gas pressure in said mold and distributing said gas through said mass and at elevated pressure causing partial dissolution of said gas in said solid material of said mass; heating the contents of said mold while still compressed until gelatinization of said material, thereby forming a homogeneous mass of said material having said gas evenly distributed therein; and cooling the thus formed mass and releasing the pressure thereon, thereby causing the same to expand and form a closed-cell gas-containing cellular body.

References Cited in the file of this patent

UNITED STATES PATENTS

| 2,531,665 | Booth | Nov. 28, 1950 |
| 2,590,156 | Carpentier | Mar. 25, 1952 |

FOREIGN PATENTS

| 527,951 | Great Britain | Oct. 18, 1940 |